Aug. 27, 1968  R. RINGEL ET AL  3,398,483
OUTWARDLY OPENING WINDOW FOR MOTOR VEHICLES
Filed June 1, 1966  2 Sheets-Sheet 1
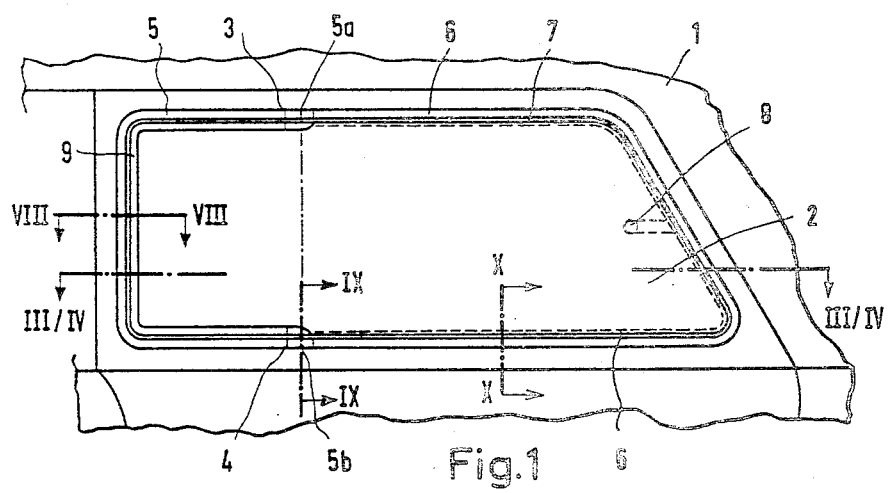
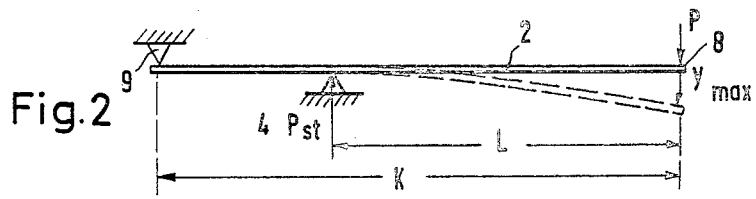
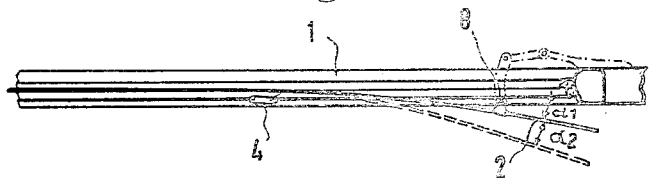
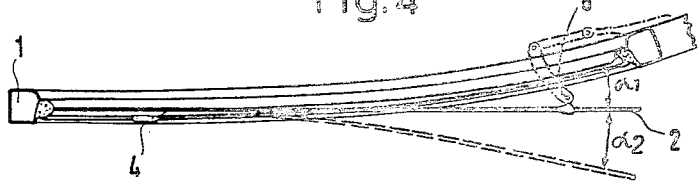
INVENTORS
R. Ringel
K. Schwenk
H. Hablitzel
Watson, Cole, Grindle & Watson
Attys.

Aug. 27, 1968    R. RINGEL ET AL    3,398,483
OUTWARDLY OPENING WINDOW FOR MOTOR VEHICLES
Filed June 1, 1966    2 Sheets-Sheet 2
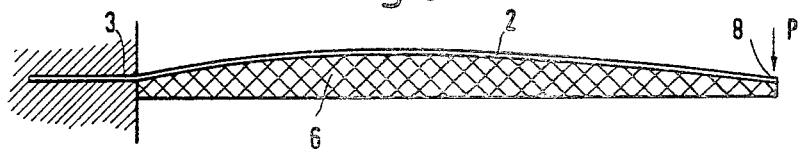
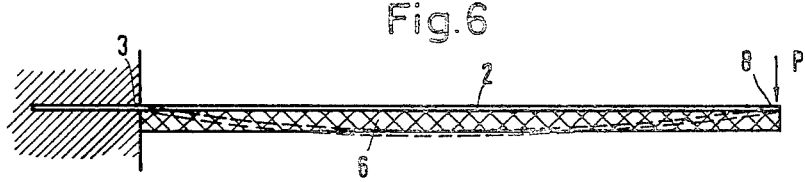
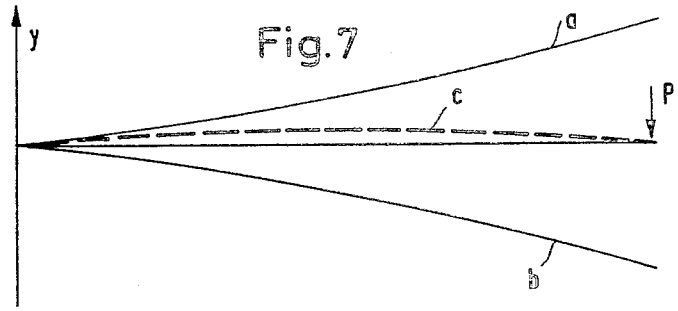
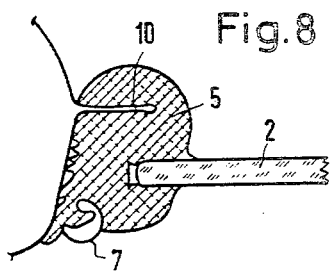
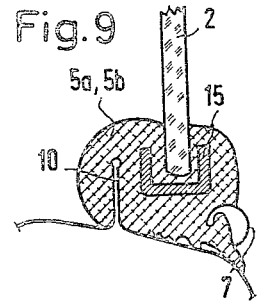
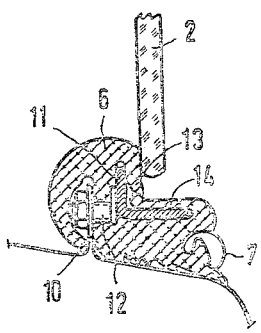
INVENTORS
R. Ringel
K. Schwenk
H. Hablitzel
Watson, Cole, Grindle & Watson United States Patent Office 3,398,483
Patented Aug. 27, 1968

1

3,398,483
OUTWARDLY OPENING WINDOW FOR
MOTOR VEHICLES
Rudolf Ringel, Kurt Schwenk, and Hermann Hablitzel,
Hannover, Germany, assignors to Messrs. Volkswagenwerk Aktiengesellschaft, Wolfsburg, Hannover, Germany, a corporation of Germany
Filed June 1, 1966, Ser. No. 554,586
Claims priority, application Germany, June 4, 1965,
V 28,627, V 28,628; July 10, 1965, V 28,850
9 Claims. (Cl. 49—34)

ABSTRACT OF THE DISCLOSURE

An outwardly opening glass window for motor vehicles having a frame surrounding a window pane elastically deformable when the pane is opened outwardly and the pane secured in the frame at one transverse edge remote from the opening-out end and along a part of the adjoining longitudinal edges.

---

The invention relates to outwardly opening windows for motor vehicles, and in fact to those wherein the edge of the window pane opposite from the opening end is fixed rigidly in the window aperture of the body part and the pane is elastically deformed for the purpose of opening-out the free, non-fixed end.

Outwardly bendable windows of this kind are in fact already known, but they have not been successful in actual practice since they are inadequately sealed at the free edges with which they abut on a sealing strip in the closed state, since the pane cannot be contained within a stiffening frame.

Therefore, the invention has as its object to improve outwardly opening windows, which are fixed to the window aperture of the motor vehicle body without hinges and are adapted to be opened outwardly by means of a per se known device, for example a toggle lever mechanism between the body and the end of the pane remote from the fixing end, in such a manner that they are suitable for practical use in conventional vehicles and more particularly guarantee good seal in the closed state.

A further object is to make the opening gap as large as possible with a given pane length.

A further object of the invention is to keep the bearing forces at the fixing regions as small as possible with a given pane size and given opening angle.

The solution of these problems is effected substantially in that a pane is provided which is fixed to the rim of the window aperture by means of a frame surrounding the pane at its transverse edge remote from the opening-out end, and a part of its adjoining longitudinal edges. Preferably the length of the fixed pane portion is so selected that it amounts to approximately a third of the total length of the pane.

To make the opening gap sufficiently large it has been found advantageous to situate the free pane portion in the relaxed state at least partly in the opening-out direction outside the plane of the window aperture. Preferably the opening angle of the window in the relaxed state of the pane is smaller than half the maximum opening-out angle.

With a plane window aperture the pane in the relaxed state can be so pre-curved in the opening-out direction that it is plane when it abuts on the sealing frame in the closed state.

2

In the case of a window aperture which is curved owing to the configuration of a vehicle body, it is possible to use a window pane which is plane in the relaxed state.

It has been found particularly advantageous to use a constructional form wherein the free rim of the window aperture has an elastic sealing frame which is made in one piece with the conventional rubber sealing strip for the fixed window pane portion, and contains a supporting insert which is rigid to bending stresses. The supporting insert is an L-section frame which is inserted behind lips of the sealing frame and which is screwed to the window aperture rim, provided with a flange in known manner, and has at the transition regions to the rigid pane portion U-shaped end portions which surround the pane edge and are arranged in recesses of the sealing strip.

Further advantages and features of the invention are shown in the following description of the figures shown in the drawings wherein:

FIG. 1 shows a pane according to the invention mounted in a window aperture of a vehicle body.

FIG. 2 is a diagrammatic sketch illustrating the loads on the window pane,

FIGS. 3 and 4 show two examples of the embodiment in a section taken on the line III/IV—III/IV in FIG. 1, FIGS. 5 and 6 are diagrammatic views showing the bending of the pane when pressure is applied.

FIG. 7 shows bending lines when the pane is subjected to load according to FIGURES 5 and 6, FIG. 8 is a sectional view through the fixing zone taken on VIII—VIII of FIG. 1, FIG. 9 is a corresponding sectional view on IX—IX of FIG. 1 and, FIG. 10 is a sectional view taken on X—X of FIG. 1.

FIGURE 1 shows part of a vehicle body 1 in which an outwardly opening window according to the invention is mounted. The window pane 2 is held in a rubber sealing strip 5 at its left-hand portion up to the points 3 and 4, and the remainder of the pane, the right-hand portion, in the closed state abuts against a pressure application sealing frame 6. Both seals together form a closed frame in which a decorative fillet 7 is inserted. The outward opening of the window is effected in known manner by means of a toggle lever mechanism which is not shown in detail and which is connected at 8 to the pane 2. The length of the fixed pane portion amounts to approximately a third of the total length of the pane. Such a division of the pane has the result that the minimum bearing forces occur at the fixing zones.

With the help of FIGURE 2 the pane sub-division according to the invention is supported by mathematical argument using a somewhat simplified illustration. Since the support in the fixing frame 5 is elastic, it can be assumed for the sake of simplification that the pane is supported in a moment-free manner at its front transverse edge 9 and at the regions 3 and 4 and is loaded with a force P at the point 8. The desired outward bending of the pane $y_{max}$ (opening gap) results in a force $P_{st}$ at the support 4. The force necessary for bending amounts to:

$$P = \frac{3 \cdot E \cdot J \cdot y_{max}}{K \cdot L^2}$$

in which E is the modulus of elasticity and J the inertia moment of the pane, K the total length of the pane and L the length of the outwardly bent pane portion.

The bearing force $P_{st}$ to be accepted by the support 4 can be calculated by considering the moment equilibrium about the support 9:

$$P_{st} = \frac{P \cdot K}{K - L}$$

If the value of the above equation is used instead of K in this second equation, the bearing force $P_{st}$ is obtained as a function of the length L of the outwardly bendable pane portion. By differentiation and nullifying the minimum bearing force is obtained for the case $$L = \tfrac{2}{3} K.$$

This calculation is made on the basis of simplifying assumptions, so that the ratio L to $K = \tfrac{2}{3}$ need only be approximately adhered to.

FIGURES 3 and 4 are sectional views on III/IV—III/IV in FIGURE 1 and illustrate two different examples of embodiment according to the invention.

In FIGURE 3 the window aperture is plane and the pane 2 is curved out of the window aperture plane in the opened-out direction, so that the window in the relaxed state of the pane is already slightly opened. By operating the toggle lever mechanism 8 the pane can on the one hand be drawn into the window plane so as to close the window, and on the other hand pressed into the widest possible open position (dot-dash line), the closing angle $\alpha_1$ between the relaxed position of the pane and the closed position being smaller than the angle $\alpha_2$ through which the pane is pressed into the maximum open position.

FIGURE 4 shows a motor vehicle body wherein the window aperture is curved in the direction away from the direction of the outward pivoting movement of the window pane, and the pane is plane in the relaxed state. What has just been said regarding the angles $\alpha_1$ and $\alpha_2$ also valid appropriately in this case.

In FIGURE 5 there is shown diagrammatically a pane 2 which is rigidly fixed at the fixing zone 3 and is subjected at the point 8 to load by a force P and is pressed over its entire length against an elastic support 6. Owing to its elastic deformability the pane 2 assumes approximately the form illustrated in the figure, that is to say it is made to follow a curved form by the pressure of the elastic support. In order to eliminate this disadvantage and the further advantage of a poor seal which this deformation involves, FIGURE 6 shows a pane which, starting from the fixing zone 3, is curved in the direction in which the pane is opened outwardly. This pane is also loaded at the point 8 by a force P and pressed against an elastic support 6. If the elastic support were not provided the pane 2 would take up approximately the dot-dash line position. Owing to the opposing force emanating from the plastic supports, however, the pane 2 is stretched out straight so that it is plane in its pressed-on state and is satisfactorily sealed uniformly.

The amount of preliminary curvature to be given to the pane 2 can be ascertained by theoretical calculation. FIGURE 7 shows the bending line a of a beam which is fixed at one end and is subjected to load by a force P and the bending line b of the same beam with uniform loading over the entire beam length, the force P and the uniform loading acting in opposite directions and being so great that the resulting moment at the fixing zone is nil. From the two bending lines there is obtained the resultant line c the equation of which provides the possibility of calculating the preliminary bend to be given to the pane. However, for manufacturing reasons, an approximate, arcuate curvature is selected for the pane in most cases.

For fixing the fixed portion of the pane a conventional mounting sealing element 5 is used which is fitted on to a flange 10 of the vehicle body. The sealing element 5 has a groove in known manner for receiving the decorative fillet 7. Short profiled rubber pieces 5a, 5b are vulcanised on to the sealing element 5 at both ends as FIGURE 9 shows. These sealing pieces 5a, 5b also have slots for holding on to the flange 10 of the vehicle body. Fitted into the pieces 5a, 5b are the two ends 15 of a supporting insert 11 which in the region of the sealing pieces 5a, 5b has a U-shaped cross-section. An elastic sealing frame 6 which is shown in section in FIGURE 10 is vulcanised on to the sealing pieces 5a, 5b. The sealing frame 6 is strengthened by the supporting insert 11 which in this region has an L-shaped cross-section. Arranged on the supporting insert 11 are a plurality of fixing bolts 12 which are used for connecting the insert to the body flange 10.

For assembly, the pane is first fitted into the groove of the sealing element 5. Then the two ends 15 of the supporting insert 11 are inserted in the sealing pieces 5a, 5b and finally the lips 13, 14 of the sealing frame 6 (see FIGURE 10) are closed about the L-section supporting insert 11. Finally the decorative fillet 7 is inserted in the seal. The entire unit is then inserted in the window aperture, for which purpose the element is fitted on to the encircling flanges 10 and the bolts 12 are screwed to the flanges. The supporting insert 11 thus serves on the one hand to retain the sealing frame and on the other hand in the region of its U-shaped portion serves to retain and support the window pane and thus to receive the forces which occur at these plates when the window is bent outwards.

The following data illustrate a particular embodiment of the window according to the invention:

|  | mm. |
|---|---|
| Length of pane | 920 |
| Height of pane | 340 |
| Thickness of pane | 4.8 |
| Length of fixed pane portion (dependent on the shape of the pane) | 200–300 |
| Opening width with the pane relaxed | 18 |
| Maximum opening width | 55 |
| Material of the pane. Sekurit, safety glass. | |

We claim:
1. Outwardly opening window with a glass plate for motor vehicles comprising a frame fixed in the opening of the motor vehicle, and a window pane rigidly secured to the frame at one end at a transverse edge remote from an opening out end and a part of adjoining longitudinal edges.
2. Window according to claim 1, characterized in that the length of the rigidly fixed pane portion is approximately a third of the total length of the pane.
3. Window according to claim 1, characterized in that the free pane portion in the relaxed state is situated at least partly outside the plane of the window aperture in the opening-out direction.
4. Window according to claim 1, characterized in that the opening angle of the window in the relaxed state of the pane is less than half the maximum opened-out angle.
5. Window according to claim 1, characterized in that the window aperture is plane and the pane is curved in the opened-out direction in the relaxed state.
6. Window according to claim 1, characterized in that the pane is so curved that it is plane in the closed state.
7. Window according to claim 1, characterized in that the window aperture is curved in the direction opposite to the direction in which the pane is opened-out, and the pane is plane in the relaxed state.
8. Window according to claim 1, characterized in that the free rim of the window aperture has an elastic sealing frame which is integral with the usual rubber sealing strip for the fixed pane portion and contains a supporting insert which is resistant to bending.
9. Window according to claim 1, characterized in that the free rim of the window aperture has an elastic sealing frame with lips which is integral with the usual rubber sealing strip for the fixed pane portion and contains a supporting insert which is resistant to bending, the supporting insert being an L-section frame which is screwed to a window aperture rim provided with a flange and which is inserted behind the lips of the sealing frame and which at the transitions to the rigid pane portion comprised U-shaped end elements extending about the pane edge and arranged in recesses of the sealing strip.

References Cited

UNITED STATES PATENTS

| | | | |
|---|---|---|---|
| 1,643,939 | 10/1927 | Becker | 160—180 X |
| 2,392,715 | 1/1946 | Zitrin | 160—179 X |
| 3,214,213 | 10/1965 | Hezler et al. | 160—37 |

FOREIGN PATENTS

| | | |
|---|---|---|
| 1,356,859 | 2/1964 | France. |
| 531,577 | 1/1941 | Great Britain. |

DAVID J. WILLIAMOWSKY, *Primary Examiner.*

J. K. BELL, *Assistant Examiner.*